United States Patent
Yokoyama et al.

(10) Patent No.: US 11,924,402 B2
(45) Date of Patent: Mar. 5, 2024

(54) INFORMATION PROCESSING APPARATUS AND INFORMATION PROCESSING METHOD

(71) Applicant: SONY GROUP CORPORATION, Tokyo (JP)

(72) Inventors: Kazuki Yokoyama, Kanagawa (JP); Koji Aoyama, Saitama (JP); Tomoya Yano, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 125 days.

(21) Appl. No.: 17/444,419

(22) Filed: Aug. 4, 2021

(65) Prior Publication Data

US 2021/0364815 A1   Nov. 25, 2021

Related U.S. Application Data

(63) Continuation of application No. 16/347,062, filed as application No. PCT/JP2017/036485 on Oct. 6, 2017, now Pat. No. 11,106,050.

(30) Foreign Application Priority Data

Dec. 19, 2016   (JP) .................................. 2016-245396

(51) Int. Cl.
*G02B 27/18*   (2006.01)
*G02B 27/02*   (2006.01)
(Continued)

(52) U.S. Cl.
CPC ............. *H04N 13/38* (2018.05); *G02B 27/02* (2013.01); *G02B 27/18* (2013.01); *G02B 30/27* (2020.01); *G02B 30/56* (2020.01)

(58) Field of Classification Search
CPC ........ G02B 30/00; G02B 30/27; G02B 30/56; G02B 27/02; G02B 27/18; G03B 35/08;
(Continued)

(56) References Cited

U.S. PATENT DOCUMENTS

| 2008/0043014 A1 | 2/2008 | Tachi et al. |
| 2011/0037682 A1* | 2/2011 | Takahashi .............. G02B 27/02 345/4 |

(Continued)

FOREIGN PATENT DOCUMENTS

| JP | 2004-334145 A | 11/2004 |
| JP | 2006-211453 A | 8/2006 |

(Continued)

OTHER PUBLICATIONS

Office Action for EP Patent Application No. 17882492.6, dated Sep. 17, 2021, 06 pages of Office Action.

(Continued)

*Primary Examiner* — Mustak Choudhury
(74) *Attorney, Agent, or Firm* — CHIP LAW GROUP

(57) ABSTRACT

To provide an information processing apparatus, an information processing method, and a program for restraining a burden on a user who observes a three-dimensional image. Therefore, a display control unit performs display control to cause a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

5 Claims, 15 Drawing Sheets

(51) Int. Cl.
  *G02B 30/27* (2020.01)
  *G02B 30/56* (2020.01)
  *H04N 13/38* (2018.01)

(58) Field of Classification Search
  CPC ...... G03B 35/24; H04N 13/00; H04N 13/356; H04N 13/261; H04N 13/275; H04N 13/38; H04N 13/302; H04N 13/305; H04N 13/361; H04N 13/332; H04N 13/359; H04N 13/398; H04N 13/189; H04N 13/324; H04N 13/161; H04N 13/31; H04N 13/317
  See application file for complete search history.

(56) References Cited

U.S. PATENT DOCUMENTS

| | | | |
|---|---|---|---|
| 2015/0268477 A1* | 9/2015 | Ge | G02B 30/31 349/15 |
| 2017/0171526 A1* | 6/2017 | Guo | H04N 13/302 |

FOREIGN PATENT DOCUMENTS

| | | |
|---|---|---|
| JP | 2009-053748 A | 3/2009 |
| JP | 2012-194756 A | 10/2012 |
| JP | 2013-237320 A | 11/2013 |
| JP | 2015-012560 A | 1/2015 |
| WO | 2007/029686 A1 | 3/2007 |
| WO | 2009/025034 A1 | 2/2009 |

OTHER PUBLICATIONS

Office Action for KR Patent Application No. 10-2019-7014845, dated Sep. 9, 2021, 05 pages of English Translation and 05 pages of Office Action.
International Search Report and Written Opinion of PCT Application No. PCT/JP2017/036485, dated Dec. 6, 2017, 12 pages of ISRWO and 13 pages of English Translation.
International Preliminary Report on Patentability of PCT Application No. PCT/JP2017/036485, dated Jul. 4, 2019, 12 pages of English Translation and 09 pages of IPRP.
Non-Final Office Action for U.S. Appl. No. 16/347,062 dated Nov. 10, 2020, 11 pages.
Notice of Allowance for U.S. Appl. No. 16/347,062, dated Apr. 29, 2021, 8 pages.
Office Action for JP Application No. 2018-557557 dated Nov. 16, 2021, 07 pages of Office Action and 07 pages of Translation.

* cited by examiner

FIG. 9
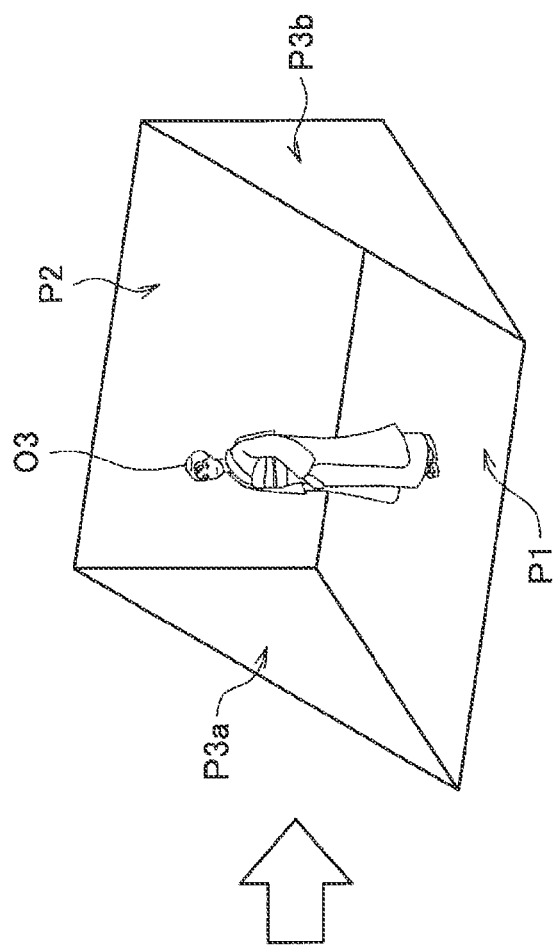
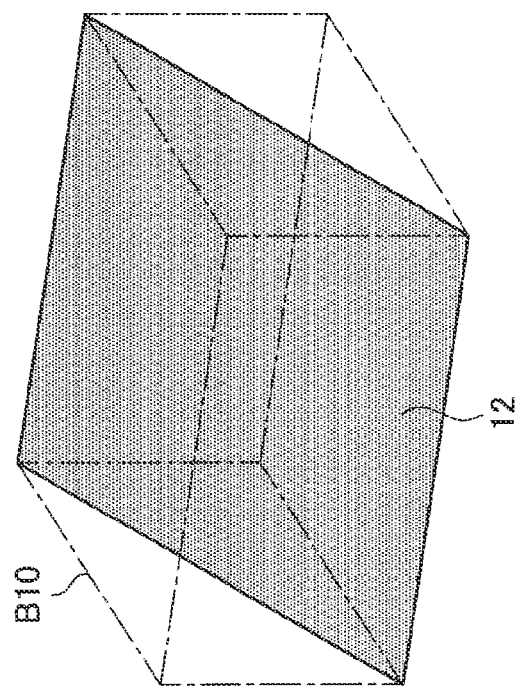

FIG. 10
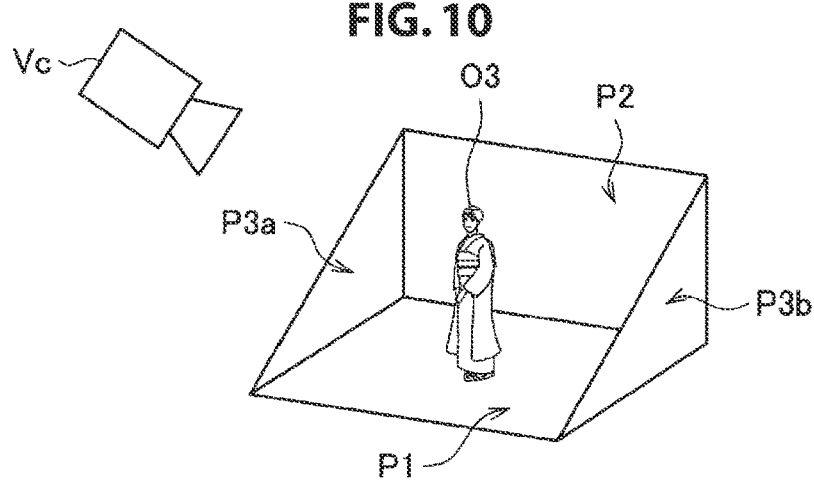
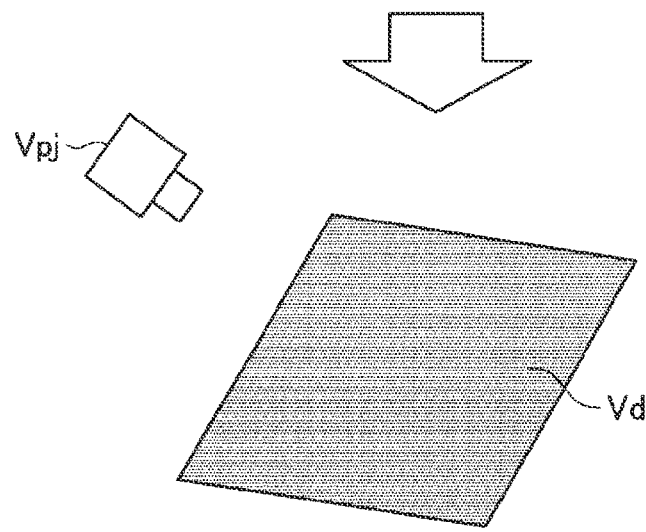
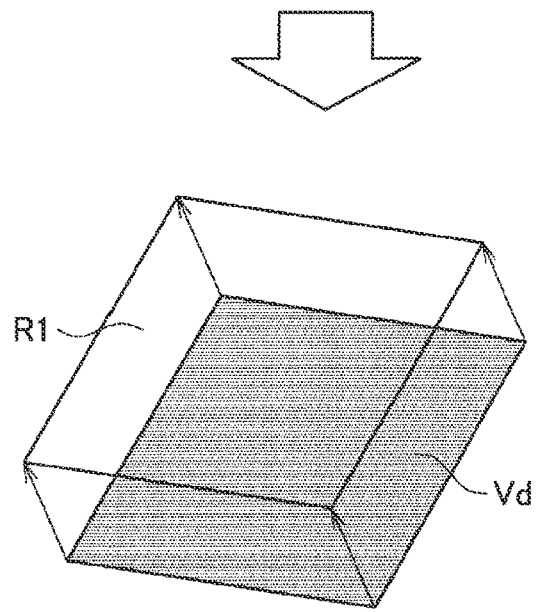

INFORMATION PROCESSING APPARATUS AND INFORMATION PROCESSING METHOD

CROSS REFERENCE TO RELATED APPLICATIONS

This application is a continuation application of U.S. patent application Ser. No. 16/347,062 filed on May 2, 2019, which claims priority from U.S. National Phase of International Patent Application No. PCT/JP2017/036485 filed on Oct. 6, 2017, which claims priority benefit of Japanese Patent Application No. JP 2016-245396 filed in the Japan Patent Office on Dec. 19, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, there have been diffused three-dimensional image display apparatuses capable of three-dimensionally displaying content. The three-dimensional image display apparatuses can display, for example, a right-eye image and a left-eye image on a display while the images are being shifted in a horizontal direction and adjust an amount of parallax on the basis of a degree of the shift, thereby displaying content at an arbitrary distance in a depth direction.

As a method of three-dimensionally displaying content, a method using dedicated glasses has been proposed. However, in recent years, there have been proposed naked-eye three-dimensional image display apparatuses capable of displaying a three-dimensional image without using dedicated glasses (e.g. Patent Literature 1 cited below and the like).

CITATION LIST

Patent Literature

Patent Literature 1: JP 2015-012560A

DISCLOSURE OF INVENTION

Technical Problem

In the naked eye three-dimensional image display apparatus described above, in order to, for example, cause a user (observer) to feel as if displayed content exists in the same space as the user, it is desirable to increase an amount of parallax. However, displaying the content in a large amount of parallax makes it difficult for the user to fuse images, and the user tends to, for example, be tired and feel sick. This may be a heavy burden on the user.

In view of this, the present disclosure proposes an information processing apparatus, an information processing method, and a program, each of which is new, improved, and capable of restraining a burden on a user who observes a three-dimensional image.

Solution to Problem

According to the present disclosure, there is provided an information processing apparatus including a display control unit configured to cause a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface. In addition, according to the present disclosure, there is provided an information processing method including causing, by using a processor, a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

In addition, according to the present disclosure, there is provided a program for causing a computer to achieve a function of causing a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

Advantageous Effects of Invention

As described above, the present disclosure can restrain a burden on a user who observes a three-dimensional image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram for describing display control processing performed by the display control unit 58 according to this embodiment.

FIG. 10 is an explanatory diagram for describing display control processing performed by the display control unit 58 according to this embodiment.

MODE(S) FOR CARRYING OUT THE INVENTION

Figure 1:
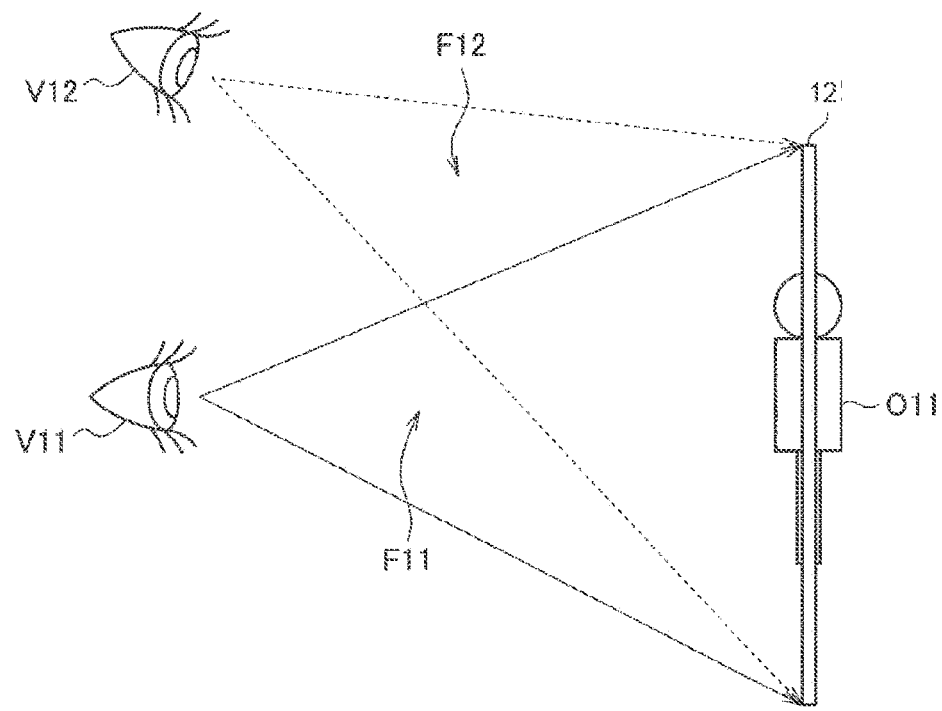
FIG. 1 is an explanatory diagram illustrating an example of three-dimensional display using a three-dimensional display.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that description will be provided in the following order.

<<1. Overview>>
<<2. Configuration>>
<<3. Operation>>
<<4. Modification examples>>
<4-1. Modification example 1>
<4-2. Modification example 2>
<4-3. Modification example 3>
<<5. Hardware configuration example >>
<<6. Conclusion>>

1. OVERVIEW

In recent years, there have been proposed naked-eye three-dimensional image display apparatuses capable of three-dimensionally displaying content without using dedicated glasses (hereinafter, also referred to as "naked-eye three-dimensional display", or simply "three-dimensional display"). Such a naked-eye three-dimensional display can display an image that is shifted in a horizontal direction at each viewing angle, and, by viewing different images with his/her left and right eyes, a user can three-dimensionally observe content.

In order to improve a stereoscopic effect that a user feels and a sense that a user feels as if content exists in the same space (hereinafter, also referred to as "togetherness") in such three-dimensional display, for example, it is desirable to increase an amount of parallax that is generated on the basis of a shift in a horizontal direction between a right-eye image and a left-eye image.

Figure 2:
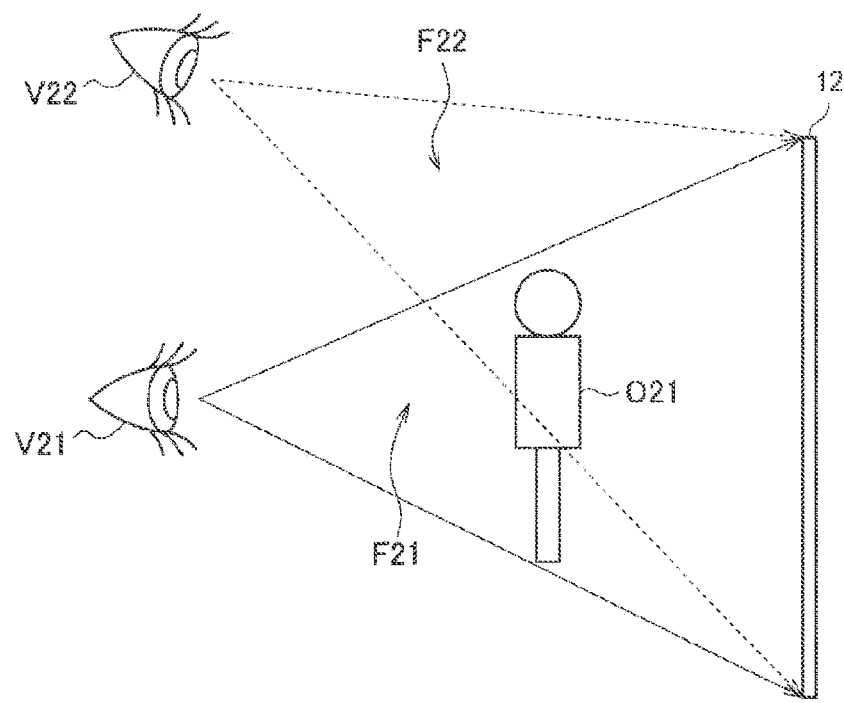
FIG. 2 is an explanatory diagram illustrating another example of three-dimensional display using a three-dimensional display.
Figure 3:
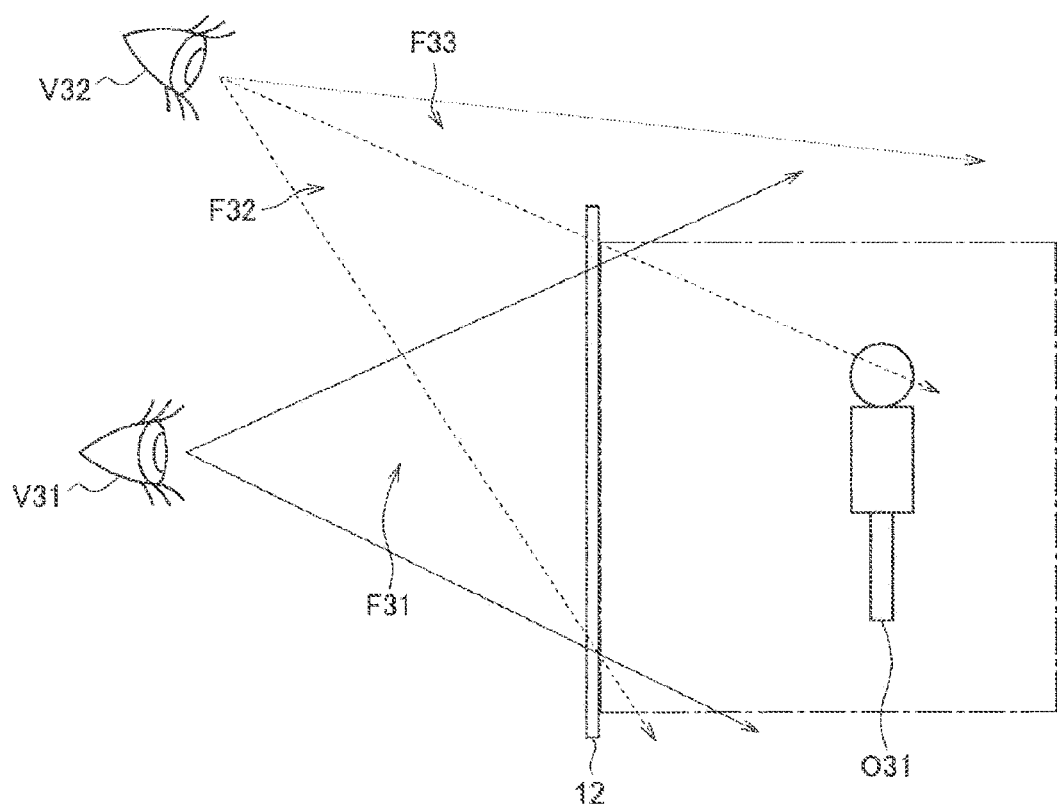
FIG. 3 is an explanatory diagram illustrating another example of three-dimensional display using a three-dimensional display.

FIGS. 1 to 3 are explanatory diagrams illustrating examples of three-dimensional display using a three-dimensional display. In the example illustrated in FIG. 1, a three-dimensional object O11 (an example of content) is displayed in the vicinity of a display surface 92 of the three-dimensional display.

In the example illustrated in FIG. 1, a user can make observation from a comparatively free point-of-sight position, and, in a case where, for example, the user makes observation at a point of sight V11, the object O11 is included in a visual field F11, whereas, in a case where the user makes observation at a point of sight V12, the object O11 is included in a visual field F12. However, because the user perceives a depth of the object O11 on the basis of the display surface 92, it is difficult to feel a sufficient stereoscopic effect in the example of FIG. 1 where the object O11 is displayed in the vicinity of the display surface 92. Further, in the example illustrated in FIG. 1, the whole object O11 exists in the vicinity of the display surface 92, and therefore the user strongly feels that the object O11 is displayed on the three-dimensional display. This also makes it difficult to feel sufficient togetherness.

In order to improve the stereoscopic effect and the togetherness, for example, it is considered that the object is placed to be perceived in front of or behind the display surface 92. In the example illustrated in FIG. 2, an object O21 is placed in front of the display surface 92 of the three-dimensional display, and, in the example illustrated in FIG. 3, an object O31 is placed behind the display surface 92 of the three-dimensional display.

However, when the object is placed in front of the display surface 92 as illustrated in FIG. 2, the object is displayed larger than that in the example illustrated in FIG. 1, and therefore, in some cases, a point-of-sight position at which the user can three-dimensionally observe the object O21 is restricted as compared with the example illustrated in FIG. 1. In the example illustrated in FIG. 2, in a case where the user makes observation at a point of sight V21, the whole object O21 is included in a visual field F21, whereas, in a case where the user makes observation at a point of sight V22, part of the object O21 is not included in a visual field F22. Therefore, in a case where the user makes observation at the point of sight V22, it may be difficult to three-dimensionally observe the object O21 because a so-called sticking effect (frame effect) occurs.

Further, in a case where the object is placed in front of the display surface 92 as illustrated in FIG. 2, an amount of parallax (amount of binocular parallax) that the user perceives is larger than that in the example illustrated in FIG. 1. Observing content in a large amount of parallax makes it difficult for the user to fuse images, and the user tends to, for example, be tired and feel sick. This may be a heavy burden on the user.

Further, when the object is placed behind the display surface 92 as illustrated in FIG. 3, the user perceives as if the object O31 exists in a box that exists behind the display surface 92. Therefore, a visual field of the user is restricted (is reduced), and, in some cases, a point-of-sight position at which the user can three-dimensionally observe the object O31 is restricted as compared with the example illustrated in FIG. 1. In the example illustrated in FIG. 3, in a case where the user makes observation at a point of sight V31, the whole object O31 is included in a visual field F31, whereas, in a case where the user makes observation at a point of sight V32, part of the object O31 is not included in a visual field F32. Herein, although the visual field of the user is a combined range of the visual field F32 and the visual field F33, a visual field where the user observes the content is restricted to the visual field F32 because the object O31 is displayed behind the display surface 92.

Further, also in a case where the object is placed behind the display surface 92 as illustrated in FIG. 3, an amount of parallax that the user perceives is increased as in the example illustrated in FIG. 2. This may be a heavy burden on the user.

Figure 4:
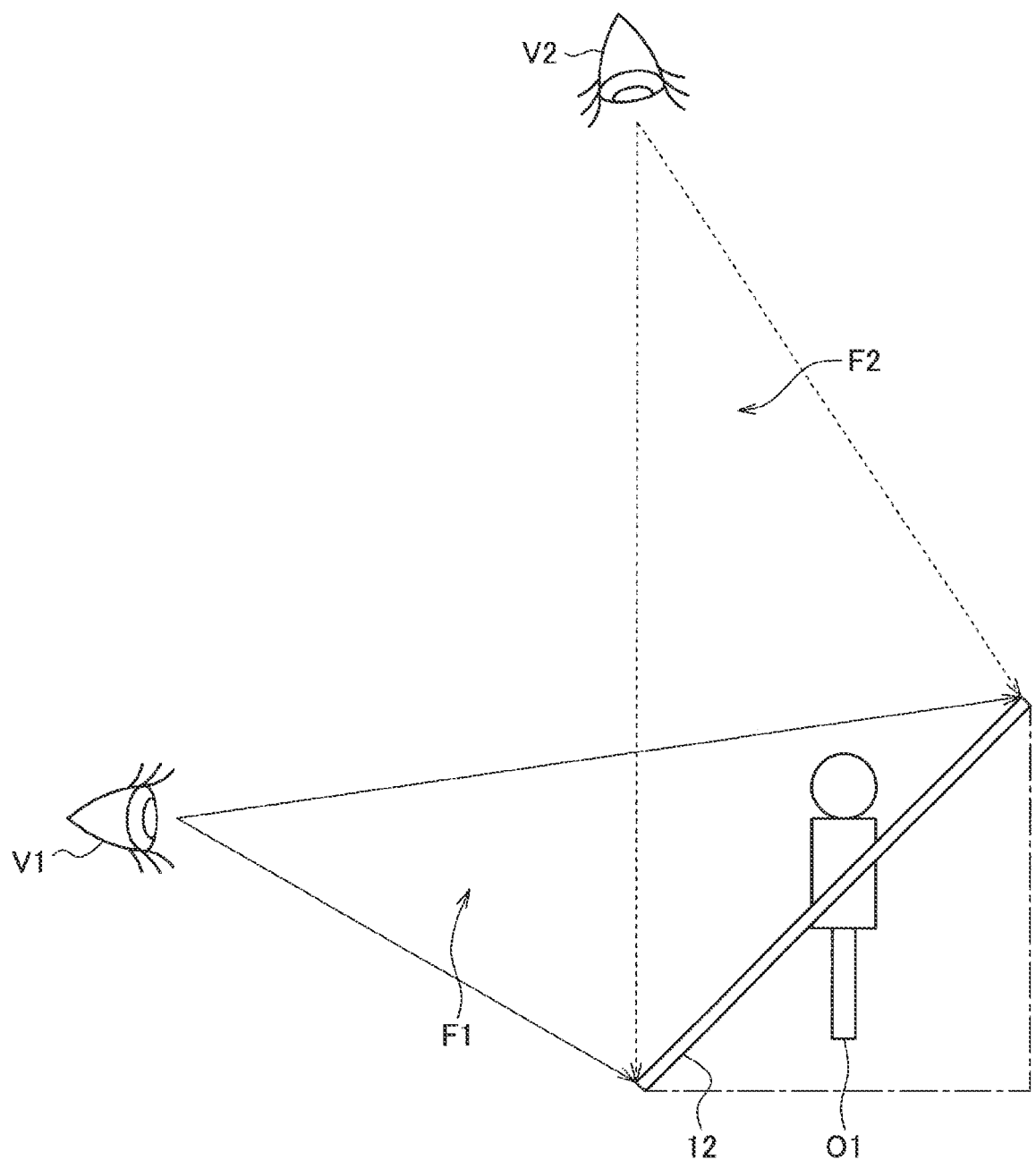
FIG. 4 is an explanatory diagram for describing an overview of an embodiment of the present disclosure.

Thus, an embodiment of the present disclosure has been made in view of the above circumstance. According to the present embodiment, a user who observes a three-dimensional image can make three-dimensional observation in a wider range while a burden on the user is being restrained. FIG. 4 is an explanatory diagram for describing an overview of the present embodiment.

In the examples illustrated in FIGS. 1 to 3, the three-dimensional display is installed so that the display surface 92 of the three-dimensional display is vertical to a horizontal plane in a real space. Meanwhile, in an example illustrated in FIG. 4, the three-dimensional display is installed so that a display surface 12 of the three-dimensional display is inclined (is not vertical) to the horizontal plane in the real space. Further, in the example illustrated FIG. 4, an object O1 (three-dimensional object) is placed to be upright with respect to the horizontal plane and cross the display surface 12.

With this configuration, it is possible to give togetherness as if the object O1 exists in the same space as the user without causing the user to be aware of the display surface. Further, it is possible to give a sufficient stereoscopic effect by placing a floor surface and a wall surface as described below, and an amount of parallax is restrained as compared with the examples illustrated in FIGS. 2 and 3. This makes it possible to restrain a burden on the user. Further, as illustrated in FIG. 4, in a case where the user makes observation at a point of sight V1, the object O1 is included in a visual field F1, and, in a case where the user makes observation at a point of sight V2, the object O1 is included in a visual field F2. Therefore, the user can make observation from a wider point-of-sight position.

Hereinafter, a configuration and operation according to the present embodiment having such effects will be successively described in detail.

2. CONFIGURATION

Figure 5:
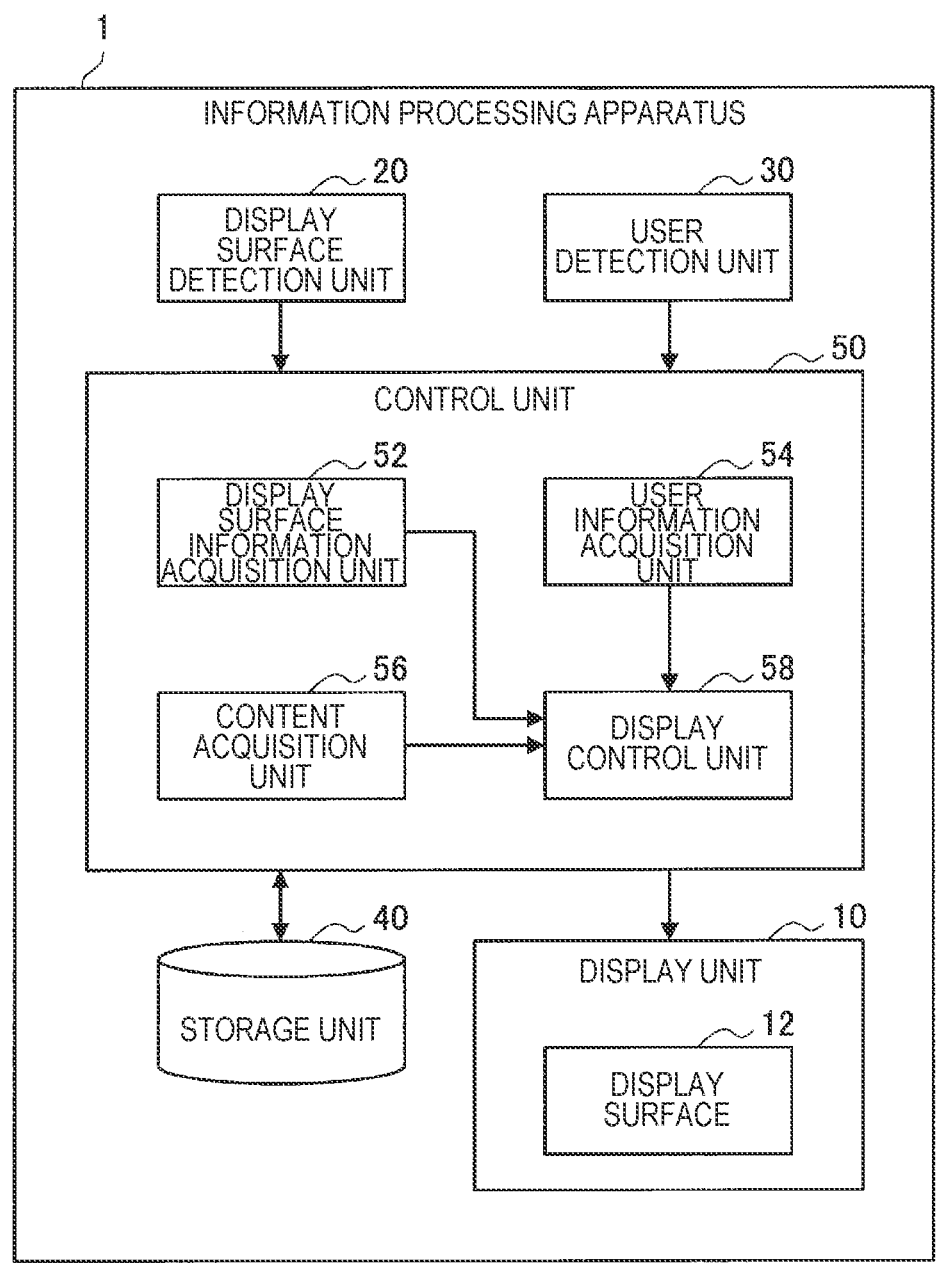
FIG. 5 is a block diagram illustrating a configuration example of an information processing apparatus according to this embodiment.

Hereinabove, the overview of the embodiment according to the present disclosure has been described. Next, the configuration according to the present embodiment will be described. FIG. 5 is a block diagram illustrating a configuration example of an information processing apparatus 1 according to the present embodiment.

As illustrated in FIG. 5, the information processing apparatus 1 according to the present embodiment includes a display unit 10, a display surface detection unit 20, a user detection unit 30, a storage unit 40, and a control unit 50.

The display unit 10 is a display that displays a three-dimensional image under control of the control unit 50 described below. For example, the display unit 10 may be a naked-eye three-dimensional display (naked-eye three-dimensional image display apparatus). In the display unit 10, a surface on which a three-dimensional image is displayed is the display surface 12.

Figure 6:
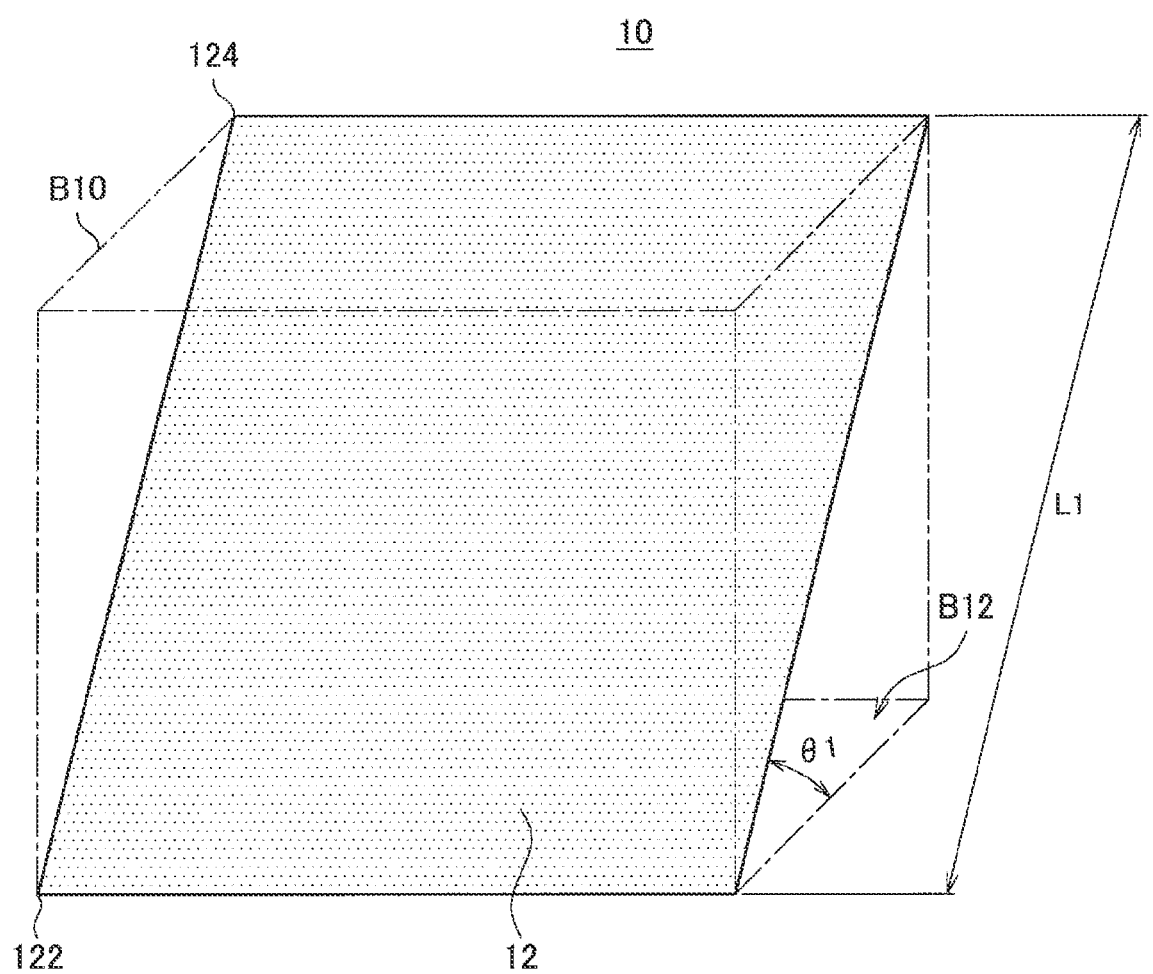
FIG. 6 is an explanatory diagram illustrating an installation example of a display unit 10 according to this embodiment.

As described above with reference to FIG. 4, the display unit 10 according to the present embodiment can be installed so that the display surface 12 is inclined (is not vertical) to the horizontal plane in the real space. FIG. 6 is an explanatory diagram illustrating an installation example of the display unit 10 according to the present embodiment. Note that, although not illustrated in FIG. 6, the display unit 10 may include a mechanism (housing) that supports the display surface 12.

As illustrated in FIG. 6, a distance from a lower end 122 of the display surface 12 to an upper end 124 of the display surface 12 is set to L1. Further, a space in which the lower end 122 of the display surface 12 and the upper end 124 of the display surface 12 are opposite sides is set as a drawing space B10 by the control unit 50 described below. Herein, a bottom surface B12 of the drawing space B10 is a surface that is horizontal to the real space (the horizontal plane in the real space). Note that it is desirable that the bottom surface B12 be substantially the same surface as an installation surface of the display unit 10.

As illustrated in FIG. 6, the display unit 10 is placed so that the horizontal plane in the real space (bottom surface B12) and the display surface 12 have an angle θ1 that is larger than 0° but smaller than 90°. A method of placement is not particularly limited, and such placement may be achieved by a shape of the display unit 10, or such placement may be achieved by supporting the display unit 10 with the use of an instrument (a stand or the like) that is different from the display unit 10.

The display surface detection unit 20 illustrated in FIG. 5 detects a posture of the display surface 12 and provides a result of the detection to the control unit 50. Herein, the posture of the display surface 12 detected by the display surface detection unit 20 may be, for example, an angle between the horizontal plane in the real space and the display surface 12 (the angle θ1 illustrated in FIG. 6).

The display surface detection unit 20 may be achieved by, for example, any one of an acceleration sensor, a gyro sensor, and a magnetic sensor having a predetermined relationship with the display surface 12 or a combination thereof.

The user detection unit 30 detects information regarding the user who observes a three-dimensional image and provides a result of the detection to the control unit 50. The user detection unit 30 may detect a position and a posture of the user, and the position and the posture of the user may be, for example, a position and a posture relative to the display surface 12. Further, the position of the user may be positions of eyes of the user, i.e., may be a position of a left eye of the user and a position of a right eye of the user. Further, the posture of the user may be a facial direction of the user or may be a line-of-sight direction of the left and right eyes of the user.

The user detection unit 30 may be achieved by, for example, any one of a camera, a depth camera, and a motion sensor or a combination thereof.

The storage unit 40 stores programs and parameters with which each configuration of the information processing apparatus 1 functions. Further, the storage unit 40 may store data of content. The data of content that the storage unit 40 stores may include, for example, data such as a three-dimensional object (3D image), a planar object (2D image), audio, and the like. Further, the storage unit 40 may store information regarding the display surface, and the information regarding the display surface may include, for example, information regarding the distance (the distance L1 illustrated in FIG. 6) from the lower end of the display surface to the upper end thereof.

The control unit 50 controls each configuration of the information processing apparatus 1. Further, as illustrated in FIG. 5, the control unit 50 also functions as a display surface information acquisition unit 52, a user information acquisition unit 54, a content acquisition unit 56, and a display control unit 58.

The display surface information acquisition unit 52 acquires display surface information regarding the display surface 12. For example, the display surface information acquisition unit 52 may acquire, from the display surface detection unit 20, information regarding the angle between the horizontal plane in the real space and the display surface 12 (the posture of the display surface 12) as the display surface information. Further, the display surface information acquisition unit 52 may acquire, from the storage unit 40, information regarding the distance from the lower end of the display surface to the upper end thereof as the display surface information. The display surface information acquisition unit 52 provides the acquired display surface information to the display control unit 58.

The user information acquisition unit 54 acquires user information regarding the user. For example, the user information acquisition unit 54 acquires, from the user detection unit 30, information regarding a position (a position of the left eye of the user and a position of the right eye of the user) and a posture of the user as the user information.

Note that the user information acquisition unit 54 may directly or indirectly acquire the information regarding the position and the posture of the user from the user detection unit 30. For example, in a case where the user detection unit 30 is a camera directed in an observation direction of the display surface 12, the user information acquisition unit 54 may specify user information on the basis of an image provided from the user detection unit 30 and indirectly acquire the user information. The user information acquisition unit 54 provides the acquired user information to the display control unit 58.

The content acquisition unit 56 acquires data of content regarding display. For example, the content acquisition unit 56 reads data of content stored in the storage unit 40, thereby acquiring the data. The content acquisition unit 56 provides the acquired data of content to the display control unit 58.

The display control unit 58 controls display of the display unit 10 on the basis of the display surface information provided from the display surface information acquisition unit 52, the user information provided from the user information acquisition unit 54, and the data of content provided from the content acquisition unit 56.

The display control unit 58 may render the drawing space described above with reference to FIG. 6 on the basis of the position of the user (the positions of the left and right eyes), perform orthographic projection on the basis of the position of the user, and generate a three-dimensional image (a left-eye image and a right-eye image), thereby causing the display surface 12 of the display unit 10 to display the three-dimensional image. With this configuration, the display control unit 58 does not need to generate images for all points of sight (viewing angles) which the display unit 10 can display and only needs to generate images for two points of sight. This makes it possible to restrain throughput. Note that details of such generation of the three-dimensional image based on the position of the user will be described below with reference to FIG. 10.

For example, the display control unit 58 may cause the display surface 12 of the display unit 10 to display the three-dimensional image so that a floor surface (first plane surface) parallel to the horizontal plane is observed in an area based on the distance from the lower end of the display surface 12 to the upper end thereof and the angle between the horizontal plane in the real space and the display surface 12.

Further, the display control unit 58 may cause the display surface 12 of the display unit 10 to display the three-dimensional image so that a back-wall surface (second plane surface) that is in contact with the upper end of the display surface and is vertical to the above-mentioned floor surface (i.e. is vertical to the horizontal plane) is observed.

Further, the display control unit 58 may cause the display surface 12 of the display unit 10 to display the three-dimensional image so that a three-dimensional object placed on the floor surface is observed.

Figure 7:
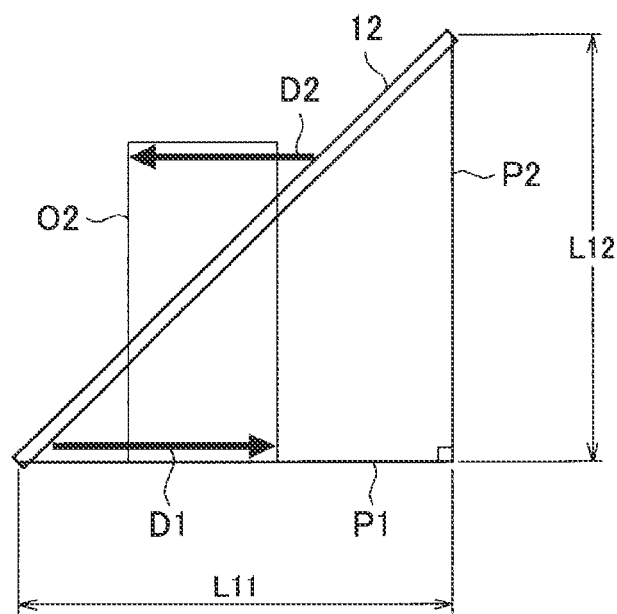
FIG. 7 is an explanatory diagram for describing a stereoscopic effect that a user perceives on the basis of a three-dimensional image that a display control unit 58 according to this embodiment causes to be displayed.

FIG. 7 is an explanatory diagram for describing a stereoscopic effect that the user perceives on the basis of a three-dimensional image that the display control unit 58 causes to be displayed.

As illustrated in FIG. 7, a floor surface P1 parallel to the horizontal plane is observed. As illustrated in FIG. 7, it is desirable that the floor surface P1 be placed to be in contact with the lower end of the display surface 12. Further, as illustrated in FIG. 7, it is desirable that a back-wall surface P2 vertical to the floor surface P1 be placed to be in contact with the upper end of the display surface 12. With this configuration, it is possible to perform drawing so that a binocular parallax and a motion parallax of an image to be displayed on the lower end and the upper end of the display surface 12 are reduced (e.g. become 0). As described above, the display control unit 58 generates a three-dimensional image on the basis of a position of the user, and therefore a detection error of the position of the user and latency (delay) may occur. However, the image is drawn so that the binocular parallax and the motion parallax are reduced at the lower end and the upper end of the display surface 12, and therefore, even in a case where a detection error or latency occurs, a change hardly occurs in the vicinity of the lower end and the upper end of the display surface 12. Thus, the user hardly feels that a position of the whole content moves (is shifted).

Further, in a case where the floor surface P1 and the back-wall surface P2 are placed as described above, a length L11 of the floor surface P1 in a depth direction and a height L12 of the back-wall surface P2 can be expressed by the following expressions (1) and (2) by using the distance L1 and the angle θ1 illustrated in FIG. 6.

$$L11=L1\times\cos\theta1 \quad (1)$$

$$L21=L1\times\sin\theta1 \quad (2)$$

With this configuration, an area where the floor surface P1 and the back-wall surface P2 are observed is an area based on an actual physical length and placement of the display surface 12, and therefore the user easily recognizes (fuses images of) the floor surface and the back-wall surface. As a result, the user can easily recognize a space to be drawn (drawing space), and therefore a burden regarding three-dimensional observation is restrained.

Further, as illustrated in FIG. 7, it is desirable that a three-dimensional object O2 placed on the floor surface P1 be placed to cross the display surface 12. With this configuration, the user perceives a parallax based on a distance D1 in the depth direction (backward direction) and a distance D2 in a projecting direction (forward direction) illustrated in FIG. 7 and can therefore feel a stereoscopic effect in both the depth direction and the projecting direction. As a result, it is possible to feel a sufficient stereoscopic effect with a smaller amount of parallax as compared with the examples illustrated in FIGS. 2 and 3.

Further, the user can perceive a position and a shape of the three-dimensional object O2 on the basis of the floor surface P1 and the back-wall surface P2 recognized as described above and can therefore feel stronger togetherness.

Content that the display control unit 58 causes to be displayed is not limited to the above-mentioned example. For example, the display control unit 58 may cause the display surface 12 of the display unit 10 to display a three-dimensional image so that a side-wall surface (third plane surface) that is in contact with a left end or right end of the display surface and is vertical to the floor surface (i.e. is vertical to the horizontal plane) is observed. With this configuration, it is possible to perform drawing so that a binocular parallax and a motion parallax of an image to be displayed on the left end and right end of the display surface 12 are reduced (e.g. become 0).

3. OPERATION

Figure 8:
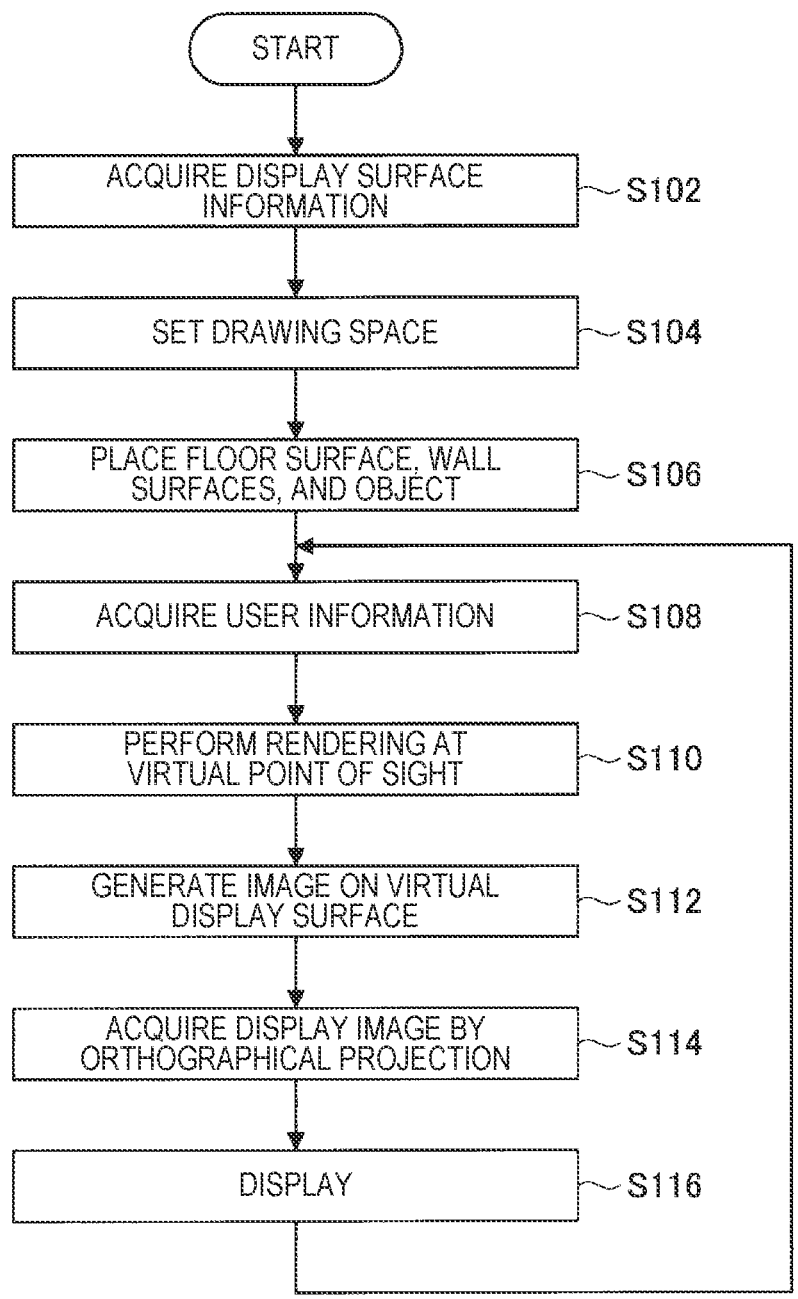
FIG. 8 is a flowchart showing an operation example according to this embodiment.

Hereinabove, a configuration example of the present embodiment has been described. Then, an operation example of the present embodiment will be described with reference to FIGS. 8 to 10. FIG. 8 is a flowchart showing an operation example of the present embodiment. Further, FIGS. 9 and 10 are explanatory diagrams for describing display control processing performed by the display control unit 58 of the present embodiment.

As illustrated in FIG. 8, first, the display surface information acquisition unit 52 acquires display surface information regarding the display surface 12 (an angle between the horizontal plane in the real space and the display surface 12 and a distance from the lower end of the display surface to the upper end thereof) (S102).

Then, the display control unit 58 sets a drawing space on the basis of the display surface information (S104). For example, as illustrated in FIG. 9, the display control unit 58 may set the drawing space B10 in which the upper end and the lower end of the display surface 12 are opposite sides.

Then, the display control unit 58 places a floor surface, wall surfaces (a back-wall surface and side-wall surfaces), and a three-dimensional object in the drawing space (S106). For example, as illustrated in FIG. 9, the display control unit 58 places the floor surface P1, the back-wall surface P2, side-wall surfaces P3 (P3a, P3b), and a three-dimensional object O3 behind the display surface 12 in the drawing space.

Then, the user information acquisition unit 54 acquires positions of left and right eyes of a user and a posture of the user as user information (S108).

As illustrated in FIG. 10, the display control unit 58 virtually installs a virtual camera Vc while setting the positions of the eyes of the user as a virtual point of sight, renders the drawing space as described above with reference to FIG. 9, and therefore acquires a point-of-sight image at the virtual point of sight (S110). The display control unit 58 may set a direction of the virtual camera on the basis of the posture of the user (a facial direction or a line-of-sight direction) or may set the direction of the virtual camera so that the virtual camera faces the display surface 12.

Then, the display control unit 58 virtually places a virtual projector Vpj at the same position and in the same direction as the virtual camera Vc and projects the point-of-sight image acquired in Step S110 from the virtual projector Vpj onto a virtual display surface Vd that is virtually placed on the display surface 12 (S112). Herein, the virtual projector Vpj may project the point-of-sight image by using the same parameters as the virtual camera Vc (e.g. a focal distance parameter, a distortion parameter, and the like).

Then, the image generated by being projected onto the virtual display surface Vd in Step S112 is orthographically projected, and therefore a display image R1 is acquired (S114). The display image R1 is a distorted image when seen from a position other than a current point-of-sight position (the positions of the eyes of the user) but is perceived as a normal image when seen from the current point-of-sight position.

Note that, although only processing for one point of sight is illustrated in FIG. 10, the display control unit 58 performs the above-mentioned processing for two points of sight of the left and right eyes and acquires a display image for the left eye and a display image for the right eye. Then, the display control unit 58 causes the display surface 12 to display the display images so that a combination of the display image for the left eye and the display image for the right eye is perceived by the user as a three-dimensional image (S116).

The above-mentioned processing in Steps S108 to S116 may be repeatedly performed as illustrated in FIG. 8.

Note that the flowchart shown in FIG. 8 is merely an example, and operation of the present embodiment is not limited to such an example. For example, the whole processing in Steps S102 to S116 may be repeatedly performed, and, in such a case, the display control unit 58 can perform display control on the basis of a change in the angle between the horizontal plane and the display surface 12.

4. MODIFICATION EXAMPLES

Hereinabove, an embodiment of the present disclosure has been described. Hereinafter, some modification examples of the embodiment of the present disclosure will be described. Note that each modification example described below may be applied to the embodiment of the present disclosure alone or may be applied to the embodiment of the present disclosure in combination. Further, each modification example may be applied instead of the configuration described in the embodiment of the present disclosure or may be additionally applied to the configuration described in the embodiment of the present disclosure.

4-1. Modification Example 1

The content described in the above-mentioned embodiment is merely an example, and the present technology is not limited to such an example. The display control unit 58 may cause various types of content to be displayed.

For example, the display control unit 58 may cause a three-dimensional image to be displayed so that shade based on the three-dimensional object is added, such as a shadow, reflection, and the like. In such a case, the display control unit 58 may cause the three-dimensional image to which shade has been added to be displayed on the basis of information regarding a light source in the real space (a position, a posture, intensity, color, and the like of the light source). The information regarding the light source may be acquired on the basis of a captured image acquired by, for example, the camera included in the user detection unit 30, another camera directed in a ceiling direction in order to acquire the light source, or the like. With this configuration, it is possible to further improve a stereoscopic effect and togetherness.

Figure 11:
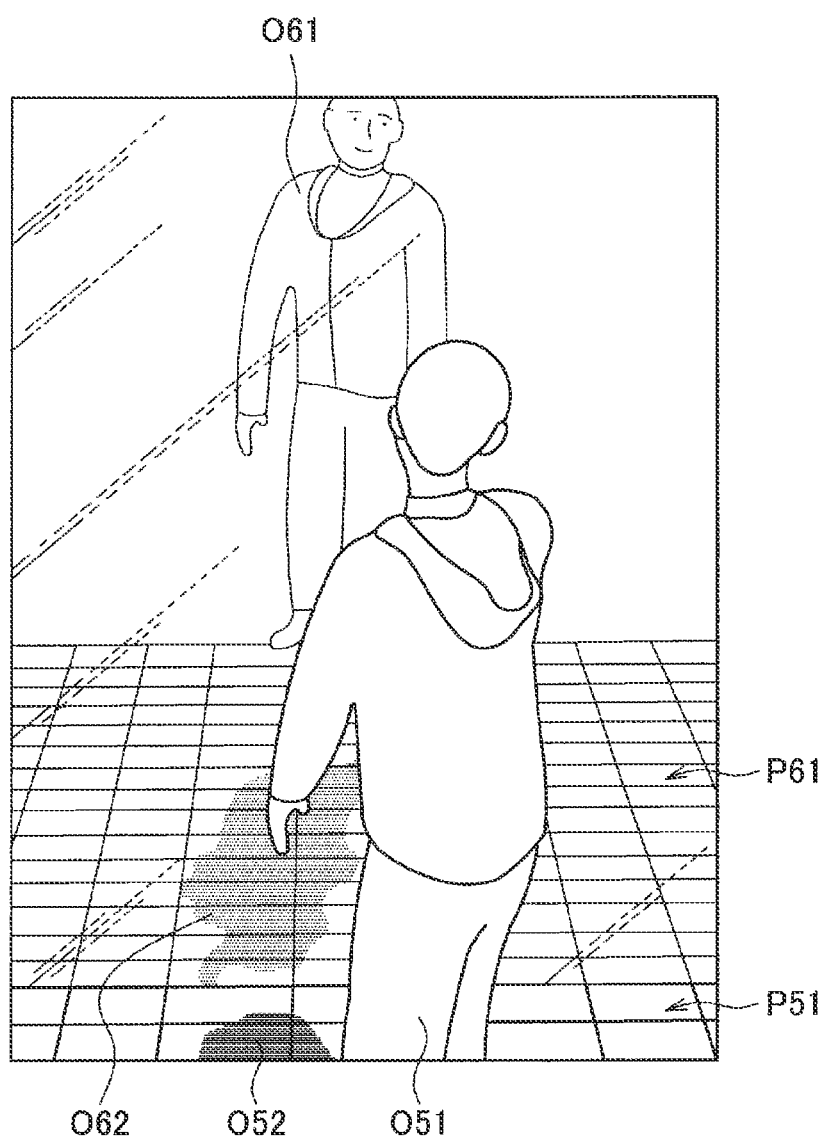
FIG. 11 is an explanatory diagram for describing a modification example of this embodiment.

Further, for example, the display control unit 58 may cause a three-dimensional image to be displayed so that the second plane surface that is in contact with the upper end of the display surface 12 and is vertical to the floor surface is observed as a mirror surface. FIG. 11 is an example of an image for one point of sight which the user visually recognizes in a case where a three-dimensional image is displayed so that the second plane surface is observed as a mirror surface.

As illustrated in FIG. 11, a mirror image O61 of a three-dimensional object O51, a mirror image P61 of a floor surface P51, and a mirror image O62 of a shadow object O52 of the three-dimensional object O51 added to the floor surface P51 are displayed on the display surface 12. The display control unit 58 reproduces reflection seen from a point of sight of the user on the basis of positions of the right and left eyes of the user and a posture thereof and draws an image on the mirror surface (second plane surface), and therefore the mirror image O61, the mirror image P61, and the mirror image O62 described above are recognized as mirror images by the user. With this configuration, it is possible to further improve togetherness.

Further, the display control unit 58 may cause a three-dimensional image to be displayed so that at least part of a captured image acquired by a camera (e.g. the user detection unit 30) directed in the observation direction of the display surface 12 (toward a side on which the user who observes the display surface 12 exists) is included in the mirror surface. For example, the display control unit 58 may cause the three-dimensional image to be displayed so that the captured image is observed behind the reproduced reflection. With this configuration, the real space in which the user exists, a figure of the user, and the like are perceived as mirror images on the mirror surface. This causes the user to feel that part of the content exists between the user himself/herself and the mirror images, and therefore it is possible to further improve togetherness.

4-2. Modification Example 2

Figure 12:
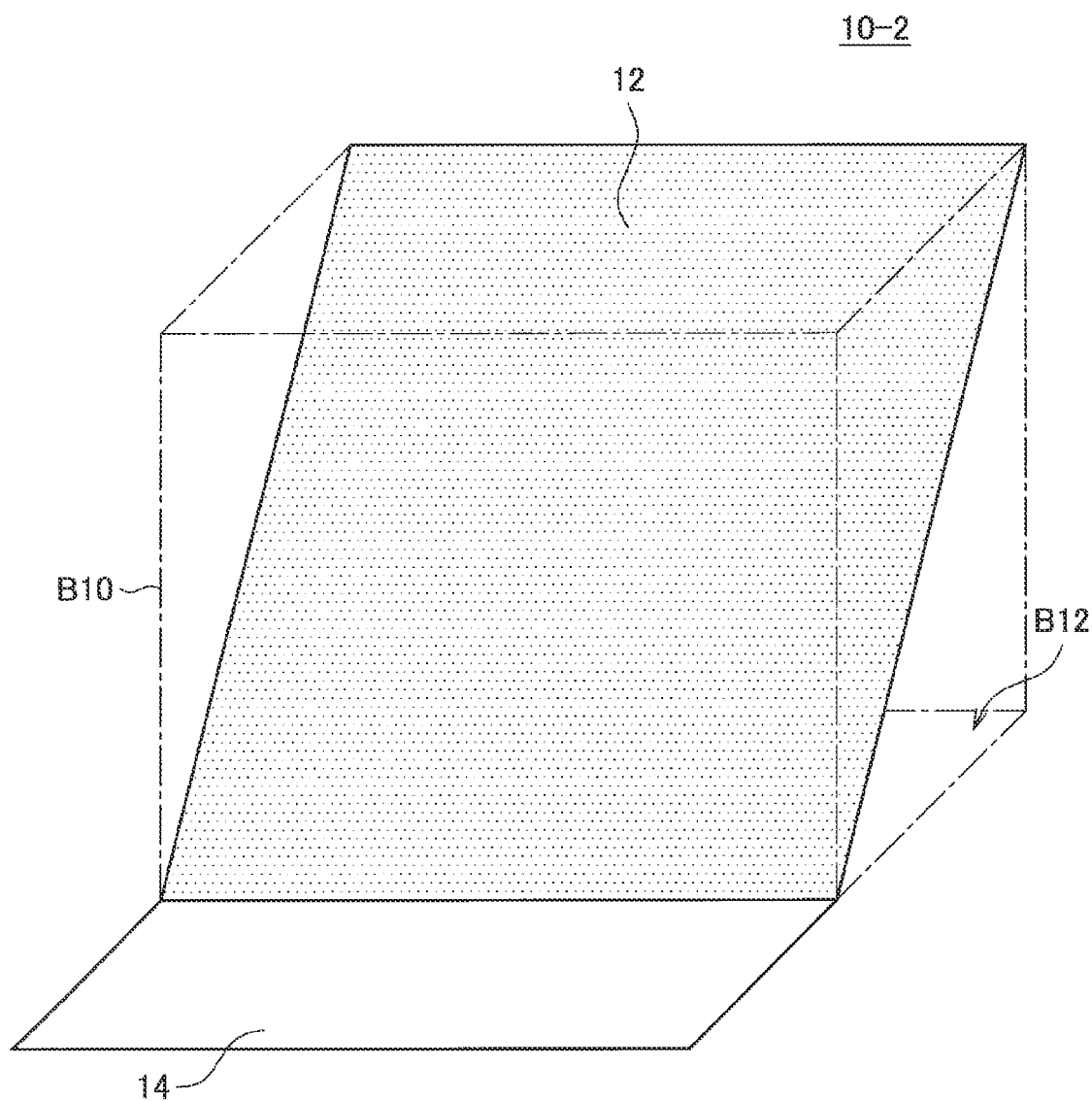
FIG. 12 is an explanatory diagram for describing a modification example of this embodiment.
Figure 13:
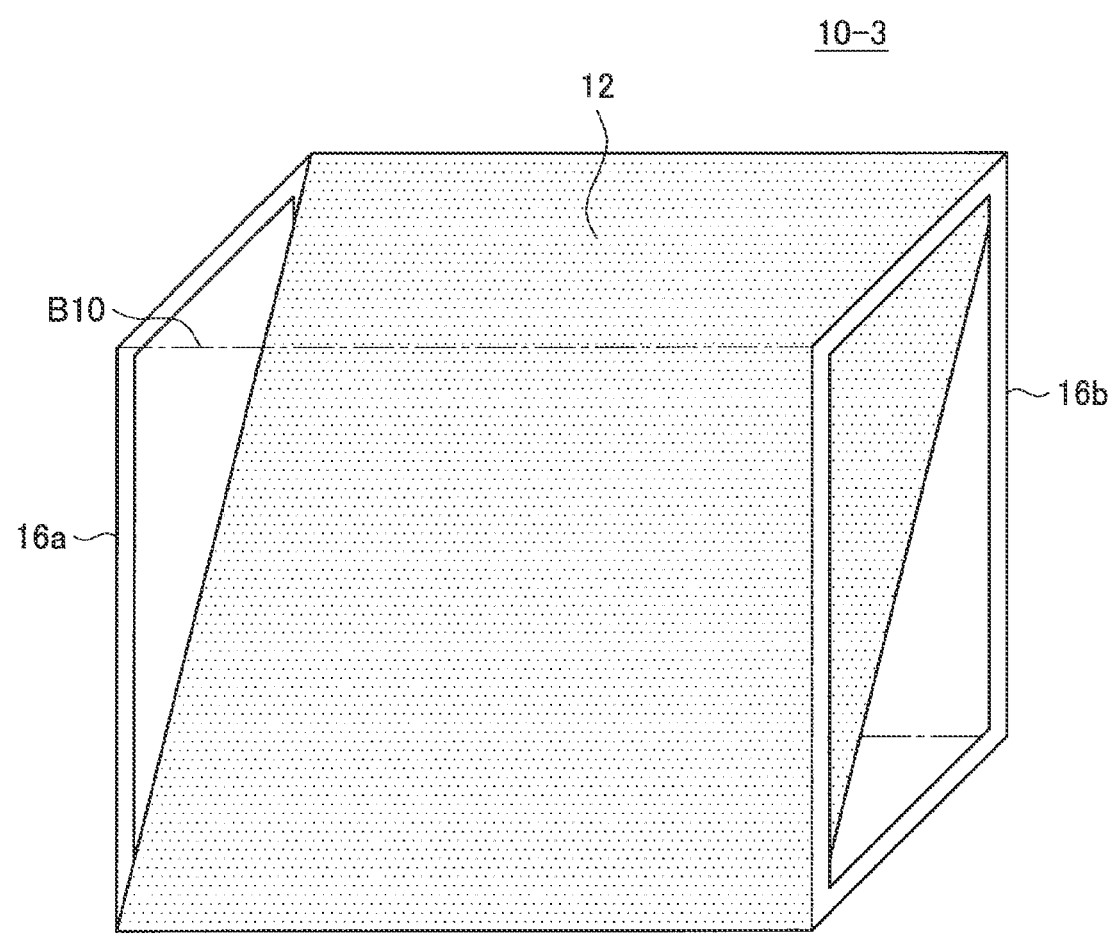
FIG. 13 is an explanatory diagram for describing a modification example of this embodiment.
Figure 14:
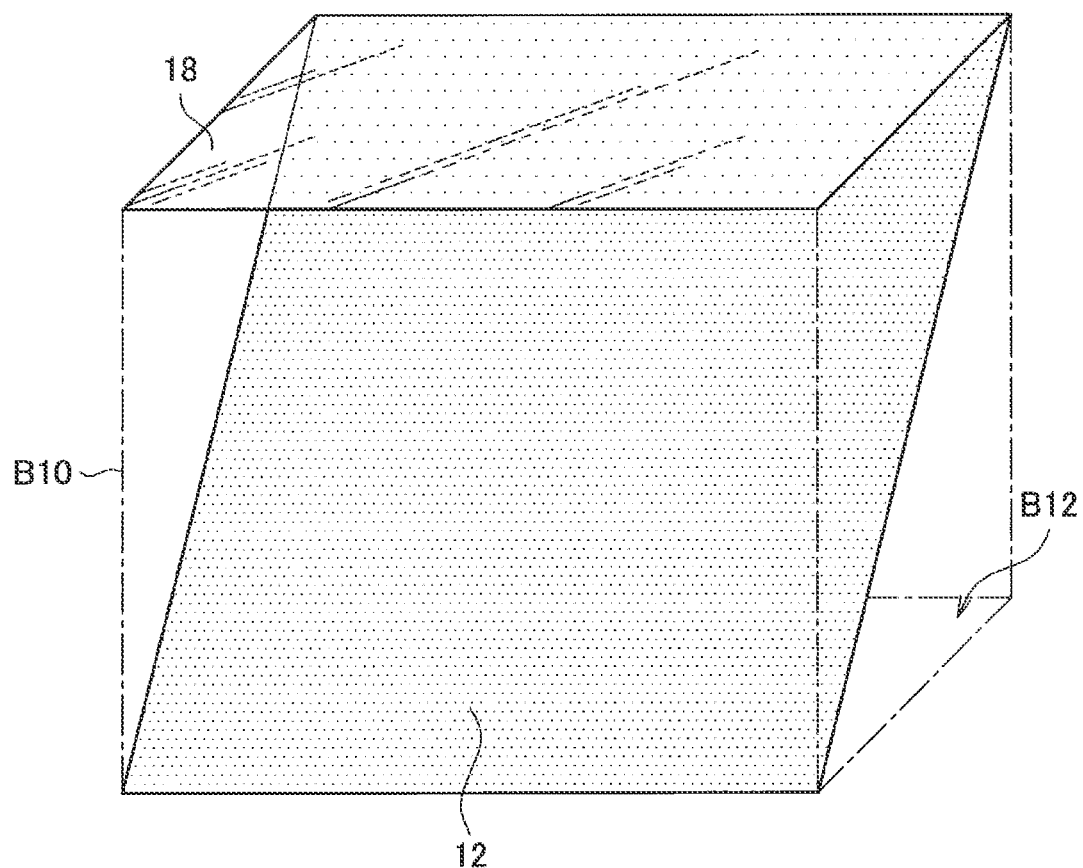
FIG. 14 is an explanatory diagram for describing a modification example of this embodiment.

In the above-mentioned embodiment, there has been described a mechanism in which a burden on the user who observes a three-dimensional image is restrained by a function of the display control unit 58. The display unit 10 may further restrain a burden on the user by including a comparison basis portion that serves as a basis for comparison with a three-dimensional image in observation of the three-dimensional image and is an actual object. FIGS. 12 to 14 are explanatory diagrams illustrating examples of the comparison basis portion serving as a basis for comparison with a three-dimensional image.

The comparison basis portion may be an opaque plate that is in contact with the lower end of the display surface 12 and is connected to the bottom surface B12 of the drawing space B10, such as a comparison basis portion 14 included in a display unit 10-2 illustrated in FIG. 12. Further, the comparison basis portion may be frames provided along left and right surfaces of the drawing space B10, such as comparison basis portions 16a and 16b included in a display unit 10-3 illustrated in FIG. 13. Further, the comparison basis portion may be a transparent plate provided along an upper surface of the drawing space B10, such as a comparison basis portion 18 included in a display unit 10-4 illustrated in FIG. 14.

With this configuration, the user can observe the comparison basis portion as a basis for comparison with a three-dimensional image. This promotes fusion of images and improves a stereoscopic effect. Further, in a case where a three-dimensional image is observed, a clue to stereoscopic vision (comparison basis portion) and the three-dimensional image tend to be simultaneously included in a visual field of the user. This can lead to reduction in sickness. Therefore, it is possible to further restrain a burden on the user who observes the three-dimensional image. Further, because the comparison basis portion is connected to the surface of the drawing space B10 or is placed along the surface of the drawing space B10 as described above, the user perceives that the floor surface P1, the wall surfaces P2 and P3, and the like described above with reference to FIGS. 7 and 9 are connected to the comparison basis portion that is an actual object. As a result, the user can perceive connection between content and the real space, and therefore togetherness is further improved.

Note that the opaque plate, the frames, and the transparent plate illustrated in FIGS. 12 to 14 are merely examples of the comparison basis portion, and any one of the opaque plate, the frames, and the transparent plate may be placed at the positions described above with reference to FIGS. 12 to 14. Further, the display unit 10 may include the comparison basis portions described above with reference to FIGS. 12 to 14 in combination.

Further, in the above-mentioned description, there has been described an example where the comparison basis portion is connected to the surface of the drawing space B10 or is placed along the surface of the drawing space B10. However, the present disclosure is not limited to such an example, and the comparison basis portion may be placed at an approximate position (in the vicinity) thereof on the basis of a shape or the like of the display unit 10.

4-3. Modification Example 3

In the above-mentioned embodiment, there has been described an example where the first plane surface parallel to the horizontal plane is a floor surface that is in contact with the lower end of the display surface 12. However, the present technology is not limited to such an example. For example, the first plane surface may be a surface (hereinafter, also referred to as "top surface") that is in contact with the upper end of the display surface 12.

Further, in a case where the first plane surface is a top surface that is in contact with the upper end of the display surface 12, the display control unit 58 may cause the display surface 12 of the display unit 10 to display a three-dimensional image so that a back-wall surface (second plane surface) that is in contact with the lower end of the display surface 12 and is vertical to the top surface is observed.

It is desirable that the above-mentioned display control be performed in a case where the display unit 10 is installed in a portion above a point of sight of the user (positions of the eyes of the user). For example, it is considered that such installation is performed in a case where the present technology is applied to an on-board device, a medical display device, or the like.

Note that the display control unit 58 may determine which surface is to be placed as the first plane surface between the top surface that is in contact with the upper end and the floor surface that is in contact with the lower end and place the first plane surface on the basis of a result of the determination. For example, such determination may be performed on the basis of any one or both of display surface information provided from the display surface information acquisition unit 52 and user information provided from the user information acquisition unit 54.

According to such a configuration, for example, even in a case where the display unit 10 is installed in a portion above the point of sight of the user, the user can easily recognize a drawing space, and therefore a burden regarding three-dimensional observation is restrained.

5. HARDWARE CONFIGURATION EXAMPLE

Figure 15:
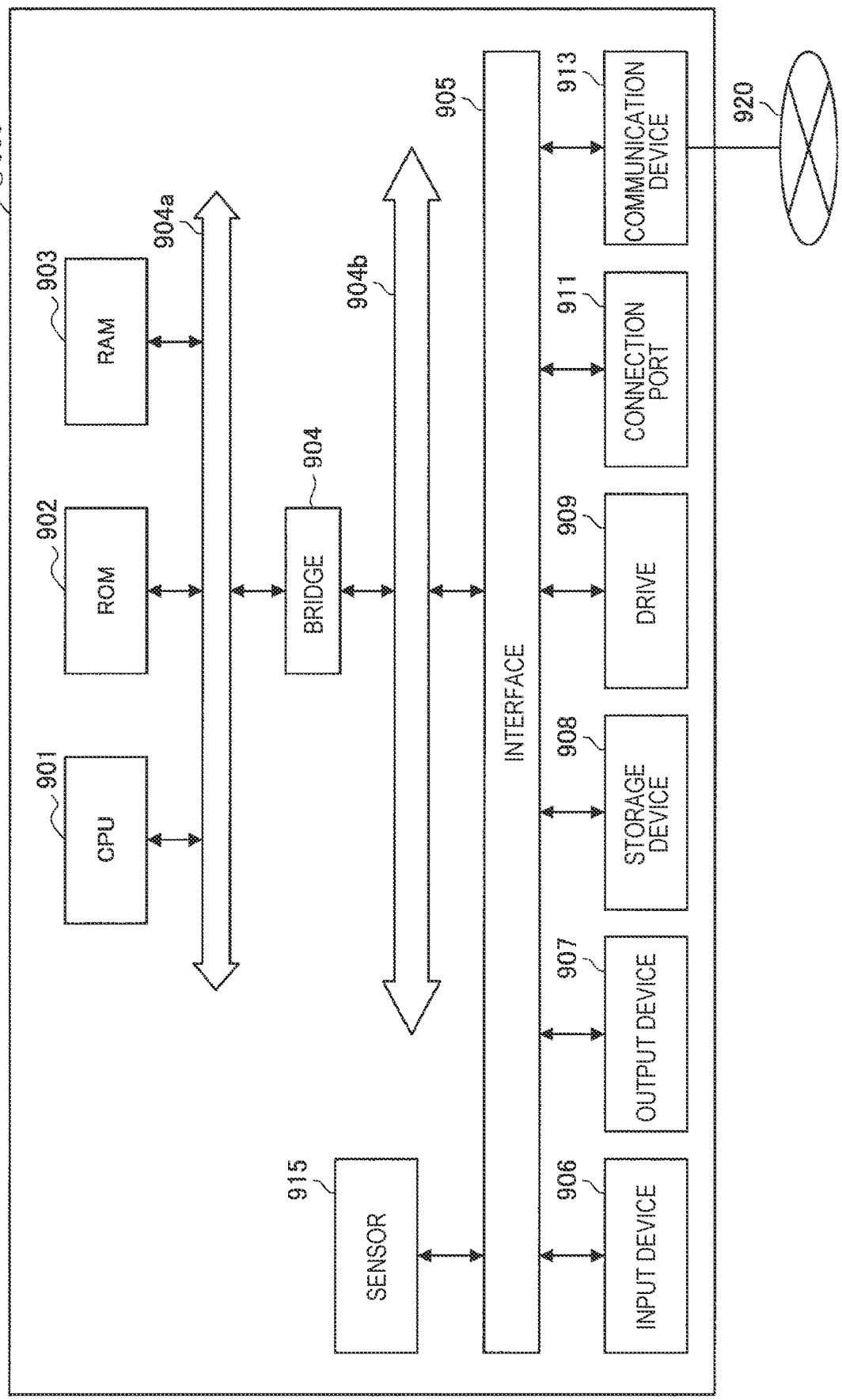
FIG. 15 is an explanatory diagram illustrating an example of a hardware configuration.

The embodiment of the present disclosure has been described hitherto. Finally, a hardware configuration of an information processing apparatus according to the present embodiment will be described with reference to FIG. 15. FIG. 15 is a block diagram illustrating an example of the hardware configuration of the information processing apparatus according to the present embodiment. Meanwhile, an information processing apparatus 900 illustrated in FIG. 15 may realize the information processing apparatus 1 illustrated in FIG. 5, for example. Information processing by the information processing apparatus 1 according to the present embodiment is realized according to cooperation between software and hardware described below.

As illustrated in FIG. 15, the information processing apparatus 900 includes a central processing unit (CPU) 901, a read only memory (ROM) 902, a random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the control unit 50, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 includes a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals. The output device 907 may form the display unit 10, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage unit 40, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device. The sensor 915 may form, for example, the display surface detection unit 20 and the user detection unit 30.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

As described above, according to the embodiment of the present disclosure, a user who observes a three-dimensional image can make three-dimensional observation in a wider range while a burden on the user is being restrained.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-mentioned embodiment, there has been described an example where the display unit 10 and the control unit 50 are included in the same apparatus. However, the present technology is not limited to such an example. For example, the display unit 10 and the control unit 50 may be included in different apparatuses. Further, part of functions of the control unit 50 may be included in different apparatuses.

Further, in the above-mentioned embodiment, there has been described an example where data of content is stored in the storage unit 40. However, the present technology is not limited to such example. For example, the content acquisition unit 56 may acquire data of content from another apparatus via a communication unit (not illustrated).

Further, in the above-mentioned embodiment, there has been described an example where the display surface 12 is a rectangular plane surface as illustrated in FIG. 6 and the like. However, the present technology is not limited to such an example. For example, the display surface 12 may be a bent surface or may have a circular shape, an oval shape, or the like. Further, the display control unit 58 may set a drawing space on the basis of a shape of the display surface 12, and, for example, in a case where the display surface 12 has a circular shape, a drawing space to be set may be a sphere.

Further, in the above-mentioned embodiment, an example where the display control unit 58 causes a three-dimensional image to be displayed on the basis of positions of the left and right eyes of the user has been described with reference to FIG. 10. However, the present technology is not limited to such an example. For example, the display control unit 58 may cause a three-dimensional image to be displayed by generating images for all points of sight which the display unit 10 can display. In such a case, the information processing apparatus 1 does not need to have functions of the user detection unit 30 and the user information acquisition unit 54.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including
a display control unit configured to cause a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

(2)

The information processing apparatus according to (1),
in which the first plane surface is in contact with the upper end or the lower end of the display surface.

(3)

The information processing apparatus according to (2),
in which the first plane surface is in contact with the lower end, and the display control unit causes the three-dimensional image to be displayed so that a second plane surface that is in contact with the upper end of the display surface and is vertical to the first plane surface is observed.

(4)

The information processing apparatus according to (2),
in which the first plane surface is in contact with the upper end, and
the display control unit causes the three-dimensional image to be displayed so that a second plane surface that is in contact with the lower end of the display surface and is vertical to the first plane surface is observed.

(5)

The information processing apparatus according to (3) or (4),
in which the display control unit causes the three-dimensional image to be displayed so that the second plane surface is observed as a mirror surface.

(6)

The information processing apparatus according to (5),
in which the display control unit causes the three-dimensional image to be displayed so that at least part of a captured image acquired by a camera directed in an observation direction of the display surface is included in the mirror surface.

(7)

The information processing apparatus according to any one of (1) to (6),
in which the display control unit causes the three-dimensional image to be displayed so that a third plane surface that is in contact with a left end or a right end of the display surface and is vertical to the first plane surface is observed.

(8)

The information processing apparatus according to any one of (1) to (7), in which the display control unit causes the three-dimensional image to be displayed on the basis of a position of a user who observes the three-dimensional image.

(9)

The information processing apparatus according to any one of (1) to (8), in which the display control unit causes the three-dimensional image to be displayed so that a three-dimensional object placed on the first plane surface is observed.

(10)

The information processing apparatus according to any one of (1) to (9), in which the display control unit causes the three-dimensional image to be displayed so that a three-dimensional object crossing the display surface is observed.

(11)

The information processing apparatus according to any one of (1) to (10), in which the display control unit causes the three-dimensional image to be displayed on the basis of information regarding a light source in the real space.

(12)

The information processing apparatus according to any one of (1) to (11), including the display unit, in which the display unit includes a comparison basis portion serving as a basis for comparison with the three-dimensional image in observation of the three-dimensional image.

(13)

An information processing method including causing, by using a processor, a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

(14)

A program for causing a computer to achieve a function of causing a three-dimensional image to be displayed so that a first plane surface parallel to a horizontal plane in a real space is observed in an area based on a distance between a lower end and an upper end of a display surface on which a display unit displays the three-dimensional image and an angle between the horizontal plane and the display surface.

REFERENCE SIGNS LIST 1 information processing apparatus
10 display unit
12 display surface
20 display surface detection unit
30 user detection unit
40 storage unit
50 control unit
52 display surface information acquisition unit
54 user information acquisition unit
56 content acquisition unit
58 display control unit

The invention claimed is:

1. A stereoscopic display apparatus, comprising:
a stereoscopic display configured to display a stereoscopic object;
a first supporting member connected to a left end of the stereoscopic display; and
a second supporting member connected to a right end of the stereoscopic display, wherein
the first supporting member and the second supporting member are configured to support, when the stereoscopic display displays the stereoscopic object, the stereoscopic display to be inclined with respect to a horizontal plane,
each of the first supporting member and the second supporting member includes at least one of a panel or a frame,
a portion of the at least one of the panel or the frame extends forward in a projecting direction from an upper end of the stereoscopic display, and
the projecting direction is opposite to a depth direction of the stereoscopic display.

2. The stereoscopic display apparatus according to claim 1, wherein the stereoscopic display is further configured to display the stereoscopic object to be three-dimensionally observed between the upper end of the stereoscopic display and a bottom end of the stereoscopic display in a horizontal direction.

3. The stereoscopic display apparatus according to claim 1, further comprising
a sensor that includes at least one of an acceleration sensor, a gyro sensor, or a magnetic sensor,
wherein the stereoscopic display is further configured to change an orientation of the stereoscopic object based on a signal from the sensor.

4. The stereoscopic display apparatus according to claim 1, wherein
the stereoscopic display is further configured to respectively display, along the first supporting member and the second supporting member, a left side-wall surface and a right side-wall surface of a drawing space including the stereoscopic object.

5. The stereoscopic display apparatus according to claim 1, wherein the at least one of the panel or the frame has a rectangular shape.

* * * * *